United States Patent [19]

Takeuchi

[11] Patent Number: 5,364,585

[45] Date of Patent: Nov. 15, 1994

[54] INJECTION ORIENTATION BLOW MOLDING METHOD

[75] Inventor: Setsuyuki Takeuchi, Toguramachi, Japan

[73] Assignee: A. K. Technical Laboratory, Inc., Nagano, Japan

[21] Appl. No.: 967,529

[22] Filed: Oct. 27, 1992

Related U.S. Application Data

[63] Continuation of Ser. No. 676,849, Mar. 28, 1991, abandoned.

[30] Foreign Application Priority Data

| Mar. 30, 1990 | [JP] | Japan | 2-85594 |
| May 22, 1990 | [JP] | Japan | 2-132325 |
| Mar. 7, 1991 | [JP] | Japan | 3-068036 |

[51] Int. Cl.$^5$ ............ B29C 49/06; B29C 49/64
[52] U.S. Cl. ............ 264/520; 264/532; 264/537
[58] Field of Search ........... 264/520, 521, 532, 537, 264/538; 425/526, 529

[56] References Cited

U.S. PATENT DOCUMENTS

| 2,331,702 | 10/1943 | Kopitke | 18/55 |
| 2,913,762 | 11/1959 | Knowles | 18/5 |
| 3,091,000 | 5/1963 | Makowski | 18/59 |
| 3,172,929 | 3/1965 | Sylvanin | 264/97 |
| 3,934,743 | 1/1976 | McChesney et al. | 264/521 |
| 3,963,399 | 6/1976 | Zavasnik | 425/242 |
| 3,979,491 | 9/1976 | Zavasnik | 264/538 |
| 4,235,837 | 11/1980 | Noonan | 264/521 |
| 4,473,515 | 9/1984 | Ryder | 264/520 |
| 4,521,369 | 6/1985 | Marcinek | 264/532 |
| 4,615,667 | 10/1986 | Roy | 264/538 |
| 4,724,116 | 2/1988 | Aoki | 264/537 |

FOREIGN PATENT DOCUMENTS

| 3506438 | 2/1985 | Germany. |
| 57-77536 | 5/1982 | Japan. |
| 57-093125 | 6/1982 | Japan. |
| 63-296921 | 5/1988 | Japan. |
| 2139551 | 11/1984 | United Kingdom | 264/520 |

Primary Examiner—Catherine Timm
Attorney, Agent, or Firm—Louis Weinstein

[57] ABSTRACT

A molding method for continuously carrying out the steps from injection molding of a synthetic resin preform to orientation blow molding thereof into a thin-wall-hollow molded article, characterized in that releasing of the preform from the injection mold is carried out during the state where the shape thereof can be maintained by a skin layer produced at the surface by quick cooling and the state where internal cooling is not yet finished and the temperature is high, and orientation blow molding of the preform is carried out within a time till a surface temperature of the preform which rises by its own internal temperature reaches a peak temperature.

16 Claims, 8 Drawing Sheets

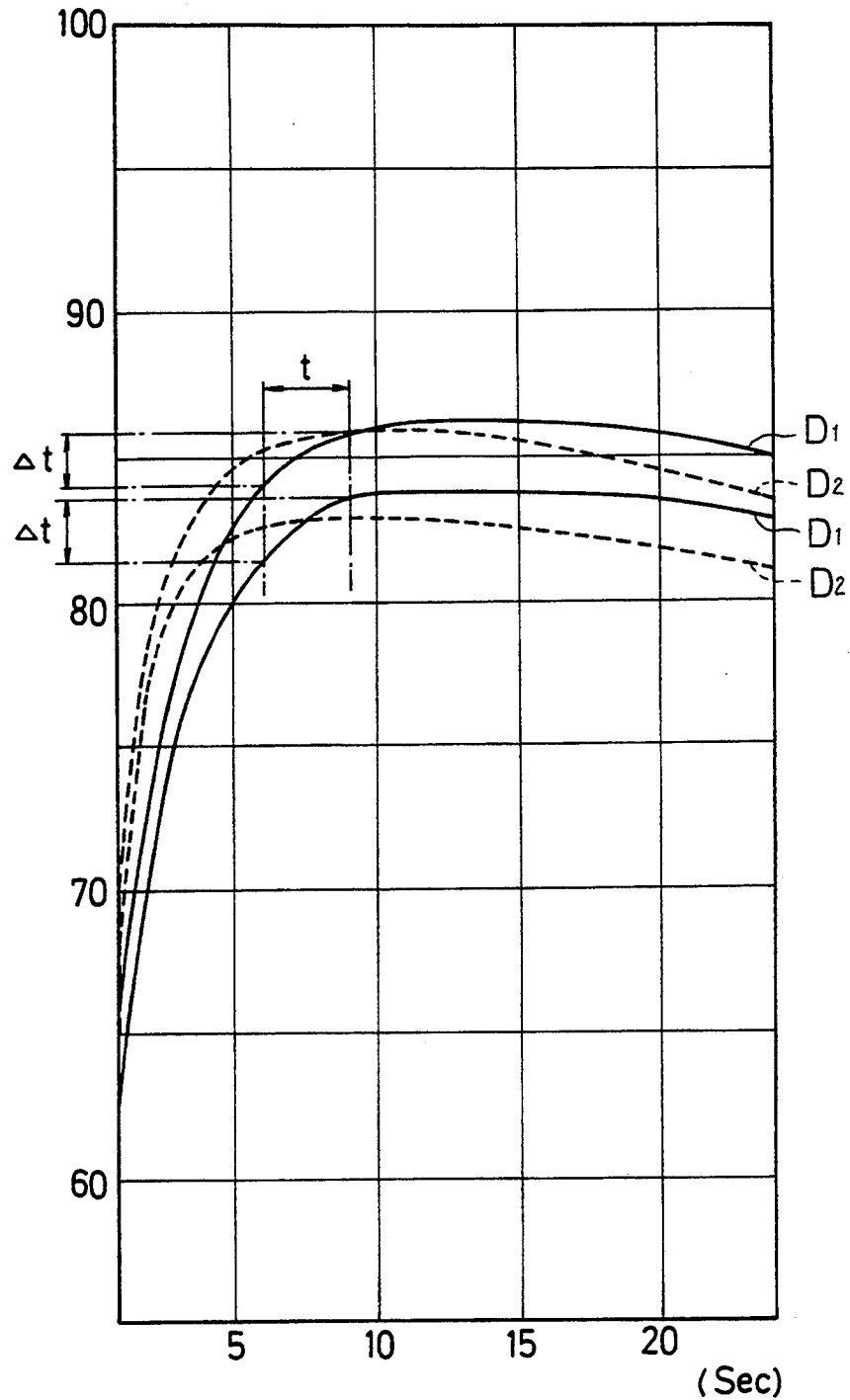

INJECTION ORIENTATION BLOW MOLDING METHOD

This is a continuation of application Ser. No. 07/676,849, filed Mar. 28, 1991 now abandoned.

BACKGROUND OF THE INVENTION

1. FIELD of the Invention

This invention relates to a molding method for continuously performing orientation blow molding from injection molding of a preform made of synthetic resin to a thin-wall hollow molded article.

2. Prior Art

As one of the molding methods generally called injection orientation blow molding, there is a three-station molding method in which a mouth portion of an injection molded preform is held by a lip mold and the preform is immediately transferred to a blow mold for orientation blow molding.

In a molding method of a three-station system disclosed in Japanese Patent Application Laid-Open No. 63-296921, orientation blow molding is carried out after inner and outer temperatures of a preform released at a high temperature are made uniform by internal heat of the preform itself to eliminate a temperature difference therebetween.

A technical idea for releasing a preform at a high temperature is already disclosed in a molding method of a four-station system.

BRIEF DESCRIPTION OF THE INVENTION

This molding method comprises releasing a preform made of injection molded polyethylene terephthalate in a temperature range at which the shape is maintained at a high temperature, making uniform a temperature difference between inner and outer surfaces and an internal center portion in the same plane section of the preform, and thereafter adjusting the temperature of the preform to a high temperature in excess of 95° C. by external energy to effect blow molding.

In the three-station system the molding method comprises three steps, i.e. "injection molding of a preform - orientation blow molding removal of a molded article", a step of adjusting a temperature to be carried out immediately before orientation blow molding which is unavoidable in the four-station system requiring four steps, "injection molding of a preform - temperature adjustment orientation blow molding - removal of a molded article" is not required.

Therefore, a temperature adjusting device for a preform and other associated devices used in the four-station system can be omitted, and in addition, there is a merit in construction that the number of neck molds, also serving as a transfer member for a preform, is reduced by one. Moreover, there is an economically advantageous feature in that molding cycle time is also shortened and cost of the machines is reduced.

However, molded articles molded by use of the three-station system tends to be limited to wide-mouth containers. This is due to the fact that an aperture of a preform is so large that there involves no technical difficulty in designing a draft or taper from an injection mold, a core and the like, and releasing at high temperature is easily carried out.

In molding narrow-mouth containers such as bottles which have an extremely small preform and are long in the oriented portion and require a large orientation magnification, the four-station system capable of controlling temperature immediately before blow molding has been used due to the difficulty of temperature control of a preform and the limitation of draft.

The difficulty of temperature control of a preform in the three-station system is that there is no means for correctly detecting a state that a surface layer is heated by internal heat, and determining when the temperature of the preform becomes uniform.

Therefore, orientation blow timing is determined by making a rough estimation from elapse of time after release, and repeating a trial at that time. This approach requires experience and time to effect the trial. In the case where a resin material being molded is polypropylene, it often occurs that the molding condition somewhat differs according to the manufacture lot. Therefore, the condition has to be set as needed, thus inevitably increasing a loss of products.

OBJECTS OF THE INVENTION

This invention has been contemplated in order to solve the task of the high temperature release in molding involved in the three-station technique. An object of this invention is to provide a new injection orientation blow molding method for molding narrow-mouth synthetic resin containers such as bottles, similar to the case of wide-mouth containers, and without being subjected to limitations of shape, draft, wall-thickness distribution and the like of a preform, despite the fact that a preform made of a crystalline resin is released at a high temperature.

It is a further object of this invention to provide a new injection orientation blow molding method which can mold, in a three-station apparatus, bottle-like containers which experience less stress and strain which is liable to occur when a low temperature preform is orientation blow molded, which are hard to expose to shrinkage deformation at the time of filling at a high temperature caused by stress and strain, and which are transparent and are uniform in distribution of wall-thickness.

It is another object of this invention to provide a new injection orientation blow molding method which can carry out the temperature adjustment of various parts of a preform at the time of injection molding whereby the time required for orientation blow molding can be materially shortened as compared with prior art techniques to increase quantity production on a per hour basis, for example.

According to a first feature of this invention for achieving the aforesaid objects, the following steps are performed: injecting and filling molten resin into an injection mold to form it into a preform as required, holding a mouth portion of said preform by a lip mold to transfer it from the injection mold to a blow mold, and orientation blow molding the preform into a thin-wall hollow molded article as required, releasing of said preform from the injection mold, which is carried out during the state where the shape thereof can be maintained by a skin layer produced in the surface by quick cooling and the state where internal cooling is not yet finished and the temperature is high, and the orientation blow molding of the preform is carried out within a time interval during which the surface temperature of the preform rises due to the internal temperature, said time interval terminating before the surface temperature reaches a peak temperature value.

According to a second feature of this invention, releasing of a preform made of polyethylene terephthalate from an injection mold is carried out in a temperature range at which the surface temperature immediately after release is above 60° C. but below 70° C., and orientation blow molding is carried out within a time till the surface temperature of the preform reaches a peak temperature and lies in a temperature region above 80° C. but below 95° C.

According to a third feature of this invention, releasing of a preform made of polypropylene from an injection mold is carried out in a temperature range at which the surface temperature immediately after release is above 90° C. but below 100° C., and orientation blow molding is carried out within a time till the surface temperature of the preform reaches a peak temperature in a temperature region above 100° C. but below 122° C. A preform made of thermoplastic synthetic resin such as polyethylene, polycarbonate, etc. in addition to the aforementioned resins as a crystalline resin can be orientation molded by similar means.

According to a fourth feature of this invention, internal heat of various portions of an oriented portion of a preform is controlled by a temperature of a mold maintained at a predetermined temperature and an intentionally adjusted wall-thickness distribution of the preform, and an orienting condition of an oriented portion is controlled by a difference of heat quantity which differs with the wall thickness to thereby make it unnecessary to adjust the temperature after release.

A bottle-like container obtained by orientation blow molding according to this invention has less stress and strain which are liable to occur when a low temperature preform is orientation blow molded. Accordingly, shrinkage and deformation during high-temperature filling caused by the stress and strain are hard to occur. Containers made of polyethylene terephthalate have an increased heat resistance.

Since a preform is oriented when the interior thereof is in a half molten state, it is hardly affected by unevenness of preform temperature. Since molding is finished before the interior of a preform is crystallized, a thin-wall container which is transparent and without one-sided wall thickness may be obtained.

Furthermore, since a skin layer is formed by quick cooling, releasing can be made even if the interior of a preform is soft. Even a bottle-like narrow-mouth container which has been difficult to be released at an adequate temperature and which has been required to adjust a temperature in terms of draft of a preform can be molded easily even in a three-station blow molding apparatus in a manner similar to wide-mouth containers.

Moreover, the time required for orientation blow molding according to the present invention is materially short as compared with prior art techniques, thus reducing the molding cycle and increasing a production amount per hour.

BRIEF DESCRIPTION OF THE FIGURES

FIG. 9 is a graph showing a change of temperature with passage of time of the surface temperature when two preforms which are different in wall thickness are orientation blow molded.

DETAILED DESCRIPTION OF THE INVENTION AND PREFERRED EMBODIMENTS THEREOF

Figure 1:
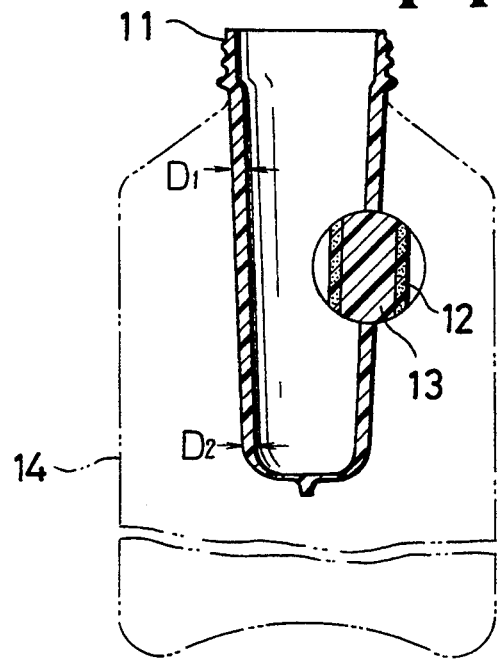
FIG. 1 is a sectional view of a high-temperature preform.
Figure 2:
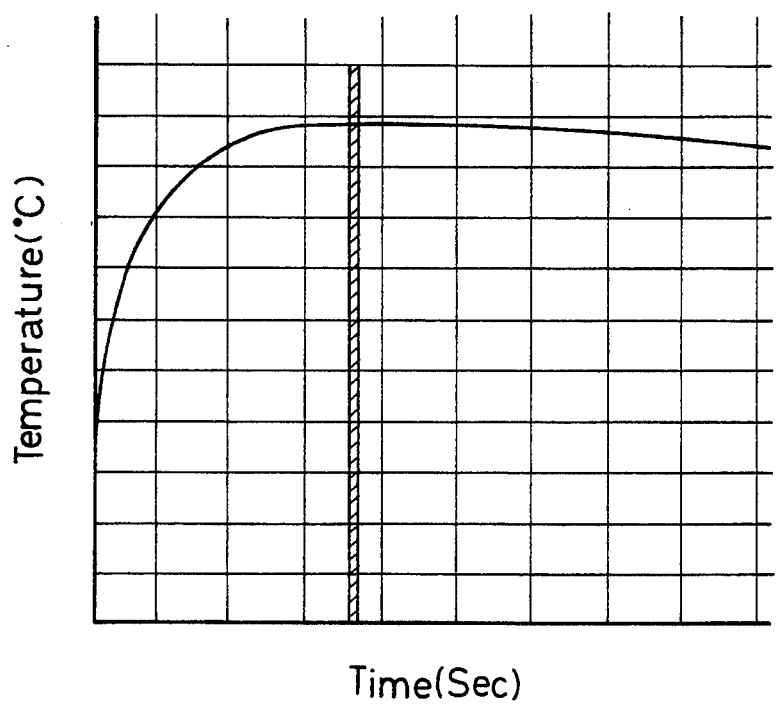
FIG. 2 is a graph showing a change of temperature with passage of time of a high-temperature preform obtained by injection molding a crystalline resin.

Molten resin is injected and filled into a mold to injection mold a preform 11 having a cross-sectional construction shown in FIG. 1, and the preform is released while maintaining a temperature as high as possible from an injection mold. When the preform is left as it is at room temperature, the surface temperature of the preform changes as shown in FIG. 2.

The change of temperature with passage of time of the surface temperature has a difference to some extent in time till it reaches a peak temperature but most thermoplastic resins used to mold containers indicate similar progress. A rise of initial surface temperature is caused by the fact that in a preform released at a high temperature, the surface of the cavity of a mold or the surface of a preform in contact with a core is solidified by cooling the mold to form a skin layer but internal cooling is not yet finished and the temperature is high when it is in a half-molten state, and cooling is cut off by releasing after which the skin layer is heated from inside of the preform.

Of course, in such a state, the temperature of the preform is not uniform except for a mouth portion which is completely cooled and solidified at the time of release. When orientation blow molding takes place in a state where a temperature difference between inner and outer portions of a preform is present, white turbidity due to crystallization or crazing occurs. Therefore, in the aforementioned conventional method, the temperature of the preform is made uniform before orientation blowing.

According to the research conducted by the present inventor, the white turbidity of a molded article in the orientation blow molding step often results from the temperature of orientation blow molding rather than a temperature difference between inner and outer portions.

According to experiments so far conducted, in the case of polyethylene terephthalate, when the surface temperature of a preform is less than 80° C., white turbidity tends to occur. It was also found that when the surface temperature of a preform immediately after release is 80° C. or more and orientation blow molding takes place after passage of very short time, crazing rarely occurs.

It has been also found however, that even in such a case, when cooling time is long and the temperature immediately after release is less than 60° C., the white turbidity tends to occur in an article which is injection blow molded even if the orientation blow molding temperature is 80° C. or more.

In case of polyethylene terephthalate, when the cooling time is short and the surface temperature immediately after release is 70° C. or more, the peak temperature is often 95° C. or more. In molding under such a set condition as described, one-sided wall thickness tends to occur, and rigidity is lost.

Accordingly, cooling time of a preform in an injection mold is limited within a certain predetermined time. However, cooling is different according to wall thicknesses even in cases where the same resin is used and further is different according to temperatures of cooling water to be used therefor. An allowable range with uniform wall thickness is more or less one second in case of polyethylene terephthalate. It is possible to obtain a surface temperature immediately after release which is capable of molding a narrow-mouth container which is transparent and well ordered in shape within the aforesaid allowable range.

Similarly, with respect to a preform made of polypropylene, the surface temperature rapidly rises from a temperature at the time of release at room temperature and reaches a peak, after which the peak temperature is maintained for a long period of time and then gradually lowers.

The time at which the temperature of the entire preform is uniform due to the internal temperature is obscure from the change by passage of time of the surface temperature. However, in conventional orientation blow molding of a high-temperature wide-mouth preform, orientation blow molding is carried out about seventeen seconds after release. Therefore, orientation blow molding was tried around the diagonal line with such a time as described used as a standard. For a preform for a wide-mouth container, it was possible to mold a thin-wall wide-mouth container having a transparent body in about seventeen seconds.

However, in case of a preform for a narrow-mouth container which is larger in orientation magnification than in the case of a wide-mouth container, even those containers which are so large in draft as to be easily released, one-sided wall thicknesses and defective molding of a bottom often occur, failing to provide a molded article.

However, even in the case of polypropylene, when the surface temperature immediately after release is 90° C. or more and the temperature of orientation blow molding is 110° C. or more, an acceptable narrow-mouth container can be molded. The allowable range of cooling time with the same wall thickness was more or less three seconds.

It is apparent from an attempt of orientation blow molding that when orientation blow molding is carried out after passage of a given time for the purpose of making a temperature of a preform uniform after release, the preform is subjected to gradual cooling, and therefore, whiteness caused by crystallization tends to occur. Naturally, it becomes difficult to mold a narrow-mouth container.

Accordingly, hardness or ease of orientation blow molding of a preform released at a high temperature is not only affected by unevenness of preform temperature but is also greatly affected by a composition of a high-temperature preform which changes by passage of time, orientation blow timing, etc.

The high-temperature preform 11 after release has a low surface temperature as can be seen in FIG. 2 immediately after it is released from the injection mold, and therefore, the surface thereof forms a skin layer 12 having a particular hardness. However, the forming condition of the skin layer 12 is different according to the cooling speed.

In the high-temperature release, a central portion is not cooled, and the internal resin 13 has a fluidity to some extent at a high temperature. A draw-down is prevented by the skin layer 12 of the surface, and even after release, the shape of the preform 11 is maintained.

The internal heat is released to the region surrounding the parison as time passes and at the same time the skin layer 12 forming the surface is heated from inside. Therefore, the surface temperature abruptly rises, and the skin layer 12 becomes softened whereas the internal temperature lowers. Therefore, the flowing portion is reduced moving toward the center portion.

The skin layer 12 whose surface temperature reaches a peak is thin to a degree that it forms a skin, and the interior thereof is in a half hardened state.

After the peak, the surface temperature slowly lowers as time passes. As for the whole preform, the temperature becomes uniform and at the same time, crystallization progresses.

In the high-temperature preform till the surface temperature reaches a peak, even if the surface is solidified to form the skin layer 12, the skin layer 12 is softened in the vicinity of the peak temperature, which is in the state where orientation can be made.

In a thick-wall portion which is high in internal heat, the skin layer 12 is first softened by heat received from inside. There is a temperature difference between a thick wall portion and a thin wall portion till some time passes after the surface temperature reaches the peak, and the aforesaid difference is evident particularly before reaching the peak.

When orientation blow molding takes place in such a state as described, the skin layer on the side of the thick wall portion where much heat is present, that is, on the side in which surface temperature is high, is first oriented in the state where internal resin in a softened state is embraced.

Naturally, the surface area increases due to the orientation, and as a result, the radiating surface becomes large and the temperature lowers to eliminate a temperature difference from the thin wall side. Furthermore, the temperature on the thin wall side relatively rises, and subsequently, orientation of the thin wall portion precedes. Such a mutual orientation is repeatedly carried out for an extremely short period of time, and the internal temperature with a large heat amount during that period lowers to a temperature suitable for orientation. And, the internal portion 13 so far oriented while being accompanied by the skin layer 12 is thinly oriented similar to the skin layer 12 halfway, whereby a molded article having a uniform distribution of wall thickness is formed.

Accordingly, in the injection molding of the preform 11, initially, the orientation amount of various portions of the preform 11 is taken into consideration in advance based on the shape of a container 14 to be a molded article whereby the wall-thickness distribution of the various preform portions is intentionally adjusted whereas the temperature of the injection mold is maintained constant, and preferably, cooling of the preform 11 molded by being injected and filled in the cavity is uniformly carried out along all portions of the parison.

For a high-temperature preform 11 having a skin layer 12 formed by quick cooling, the best result was obtained by molding at the time before the surface temperature reaches a peak. At the time it seemed to have reached the peak, one-sided wall thickness tends to occur, failing to obtain a good result.

The surface temperature when orientation blow molding takes place was 80° C. or more and 110° C. or more for polyethylene terephthalate and polypropylene, respectively, and time after release was more or less eight seconds and more or less fourteen seconds for the former and the latter, respectively.

However, it is apparent from the foregoing attempts that a better result cannot be obtained unless the skin layer 12 is formed by quick cooling. This seems to have resulted from a difference of a crystalline state produced in the skin layer 12 by cooling. A crystal formed due to quick cooling forms a fine crystal. In the case of gradual cooling, a crystal greatly grows, and joining of crystals with each other is weaker than in the case of a fine crystal.

More preferably, orientation blow molding is carried out in the range of temperature capable of being adapted to wall thicknesses of any portion of the preform 11.

According to the attempt by the present inventor, most conveniently, if a difference of wall thickness is of the order of 0.25 mm, there is not much difference in the peak temperature and the time till the peak is reached even if a difference of surface temperature immediately after release is present. Moreover, there is not much technical difficulty involved to timely grasp the temperature range to make orientation blow molding for both possible.

In the case where heat amount of various portions is controlled in the injection mold with a difference of wall thickness intentionally provided as a means for controlling an orientation degree of various portions of the preform from the shape of a molded article, the difference of wall thickness is very minute and is mostly within the allowable time including the difference of wall thickness in case of a flat container which is materially different in orientation degree between lateral and longitudinal portions thereof.

Accordingly, there is not much technical difficulty involved in that the internal heat of various portions of the oriented portion of the preform is controlled by the temperature of the mold maintained at constant temperature and the intentionally adjusted wall thickness distribution of the preform, and the orienting condition of the oriented portion is controlled by the difference of heat amount which differs according to wall thickness.

Embodiment 1

Molten resin of polyethylene terephthalate was injected and filled into an injection mold to form a narrow-mouth preform 11 as shown in FIG. 1 by quick cooling.

Three examples of preforms of different wall thickness were injection molded changing cooling time sample by sample, and the change by passage of time of the surface temperature was measured.

The preform is prepared for a one-liter container whose overall length is 124 mm. Temperatures of the preform were measured at three points, 30 mm, 60 mm, and 100 mm upwardly from the bottom, and temperatures to be measured were an average value.

As a temperature measuring unit, a digital radiation thermometer IR-AHOT (made by K. K. Chino) was used.

The injection molding conditions are as follows:

| | |
|---|---|
| Weight of Material | 33 gr |
| Injection Temperature | 275° C. |
| Mold Temperature | 13° C. |
| Draft | 1.5° |
| Injection and Filling Time | 5.3 sec. |

Note: The mold temperature means a cooling water temperature of a cavity mold and a core mold.

Figure 3:
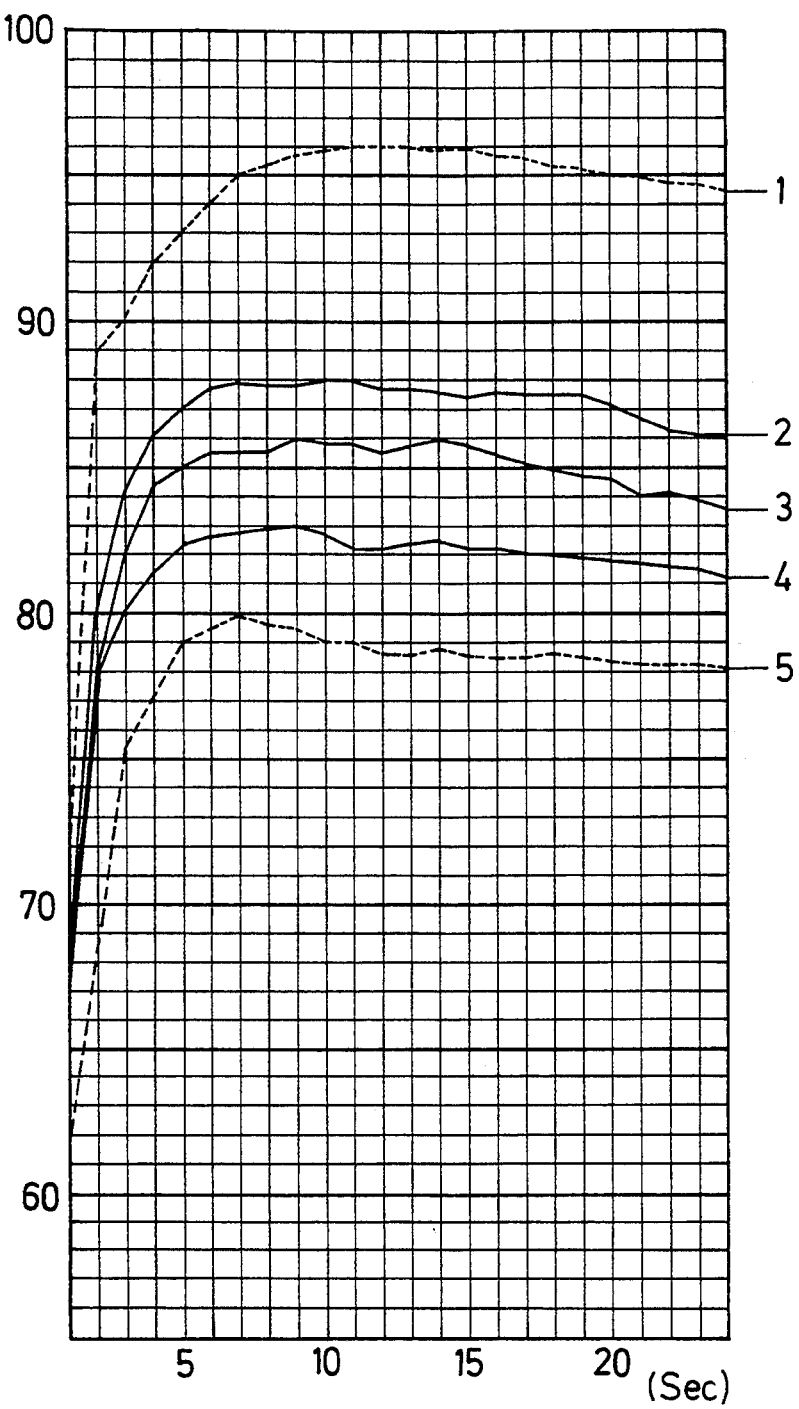
FIG. 3 is a graph showing a change of temperature with passage of time of the surface temperature of a high-temperature preform of Sample No. 1 obtained by injection molding a polyethylene terephthalate preform.
Figure 4:
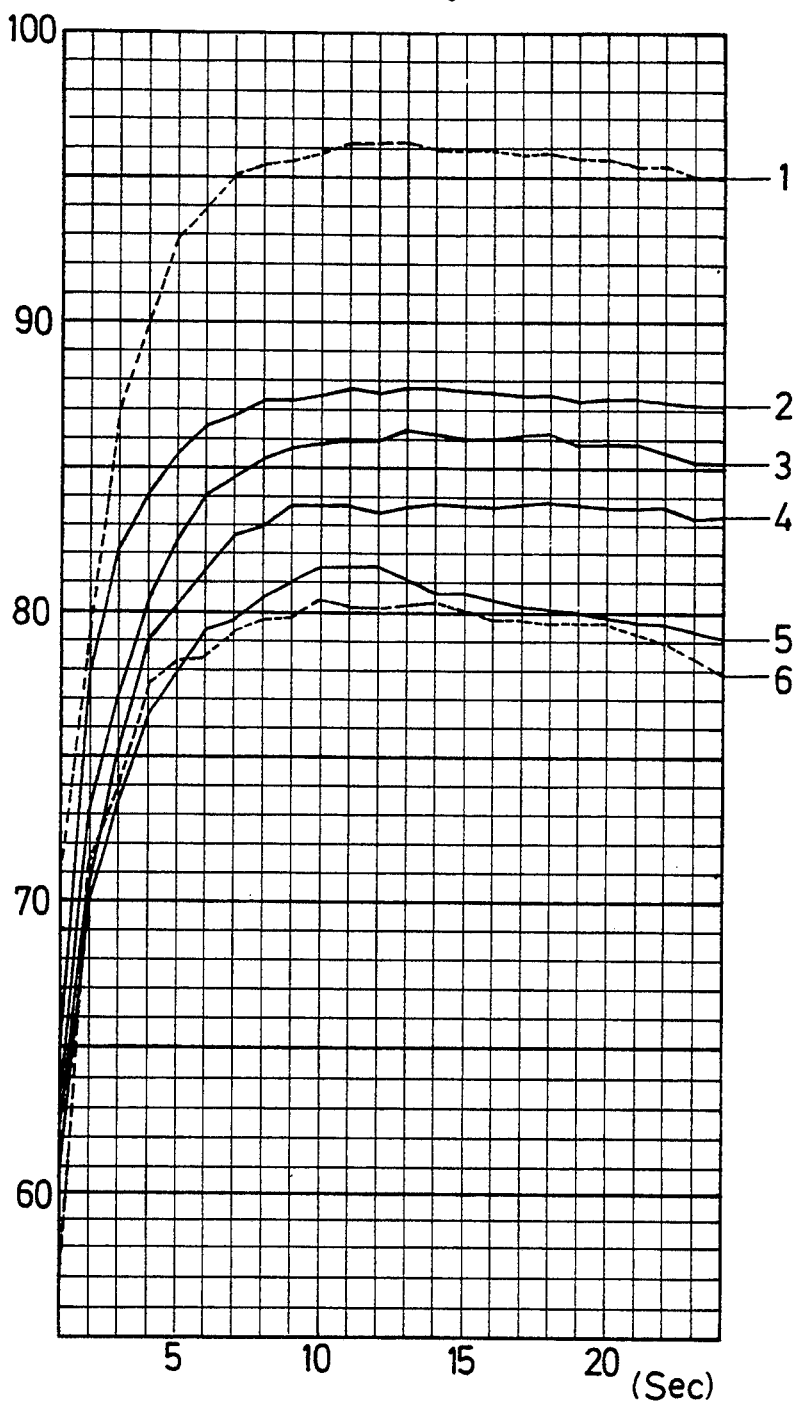
FIG. 4 is a graph showing a change of temperature with passage of time of the surface temperature of a high-temperature of Sample No. 2 obtained by injection molding a polyethylene terephthalate preform.
Figure 5:
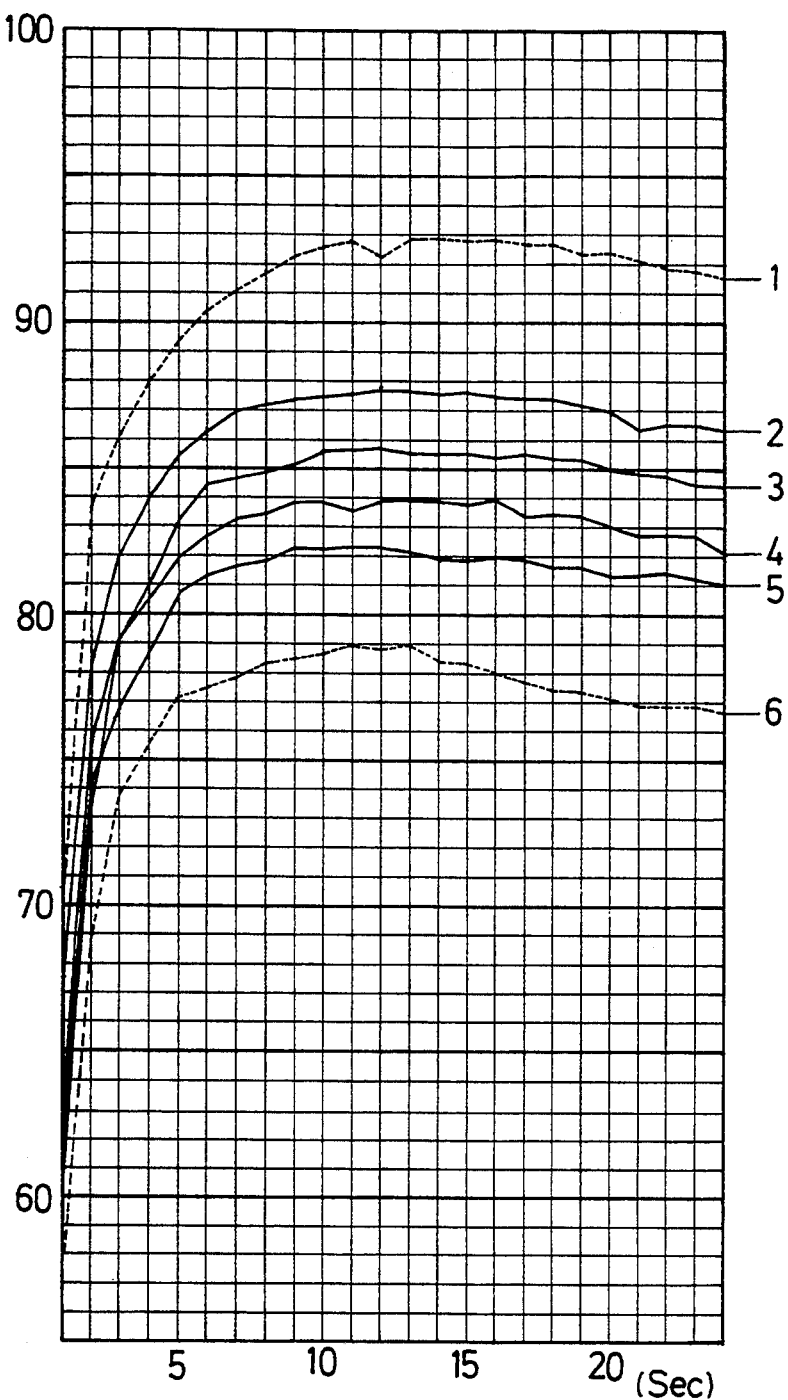
FIG. 5 is a graph showing a change of temperature with passage of time of the surface temperature of a high-temperature preform of Sample No. 3 obtained by injection molding a polyethylene terephthalate preform.

FIGS. 3 to 5 show the change by passage of time (average value) of the surface temperatures of the following samples at room temperature (22° C.), main points of which are as given in Table 1 below.

TABLE 1

| Preform Wall Thickness (mm) | | Cooling Time (sec) | Preform Temperature (°C.) | | Peak Time (sec) |
|---|---|---|---|---|---|
| | | | 1 sec after release | Peak | |
| Sample No. 1 2.80 | 1 | 3.0 | 72.0 | 96.0 | 11 |
| | 2 | 3.5 | 68.7 | 88.0 | 10 |
| | 3 | 4.0 | 68.0 | 86.0 | 9 |
| | 4 | 4.5 | 66.9 | 83.0 | 9 |
| | 5 | 5.0 | 62.3 | 79.8 | 7 |
| Sample No. 2 3.05 | 1 | 3.6 | 71.3 | 96.2 | 12 |
| | 2 | 3.9 | 65.1 | 87.9 | 11 |
| | 3 | 4.2 | 63.8 | 86.3 | 13 |
| | 4 | 4.5 | 62.5 | 83.8 | 9 |
| | 5 | 4.8 | 60.3 | 81.5 | 10 |
| | 6 | 5.5 | 57.0 | 80.2 | 10 |
| Sample No. 3 3.30 | 1 | 3.5 | 70.5 | 92.8 | 11 |
| | 2 | 4.9 | 67.4 | 87.9 | 12 |
| | 3 | 5.2 | 63.2 | 85.7 | 10 |
| | 4 | 5.5 | 62.6 | 83.9 | 9 |
| | 5 | 5.8 | 60.5 | 82.2 | 9 |
| | 6 | 6.5 | 58.0 | 79.0 | 11 |

Cooling time is the time after completion of injection and filling time.

For the above-described samples, orientation blow molding was carried out under blow air pressure of 14 kg/cm$^2$ to form a bottle-like container 14 as indicated by the broken line in FIG. 1. It has been found that the best result was obtained when orientation blow molding was carried out within the time shown in FIG. 6, that is, within time t between time $t_1$ before the surface temperature reaches the peak and time $t_2$ seemed to have reached the peak. However, in the case of a preform whose surface temperature immediately after release is outside the range of 60° C. to 70° C. at a normal temperature or a preform whose surface temperature at the time of orientation blow molding is outside the temperature region of 80° C. to 95° C., satisfactory molded articles were not obtained as shown in Table 2 below.

TABLE 2

| Preform wall thickness (mm) | | Temperature 1 sec. after release | Temperature at orientation blow molding | Time of passage (sec.) | Molded state of molded articles. Wall thickness of body portion: 0.3 mm |
|---|---|---|---|---|---|
| Sample No. 1 2.80 | 1 | 72.0 | 95.5 | 9.0 | Bad, short of rigidity one-sided wall thickness |
| | 2 | 68.7 | 87.9 | 7.0 | Good |
| | 3 | 68.0 | 85.5 | 8.0 | Good |
| | 4 | 66.9 | 82.8 | 7.5 | Good |
| | 5 | 62.3 | 79.5 | 6.0 | Bad, short of rigidity, one-sided wall thickness |
| Sample No. 2 3.05 | 1 | 71.3 | 95.0 | 8.0 | Bad, short of rigidity one-sided wall thickness |
| | 2 | 65.1 | 86.8 | 7.0 | Good |
| | 3 | 63.8 | 85.0 | 7.5 | Good |
| | 4 | 62.5 | 82.8 | 8.0 | Good |
| | 5 | 60.3 | 81.4 | 8.0 | Good |
| | 6 | 57.0 | 79.0 | 7.5 | Bad, white turbidity, large one-sided wall thickness |
| Sample No. 3 3.30 | 1 | 70.5 | 92.0 | 8.0 | Bad, short of rigidity, one-sided wall thickness |
| | 2 | 67.4 | 88.8 | 8.5 | Good |
| | 3 | 63.2 | 85.7 | 9.5 | Good |
| | 4 | 62.6 | 83.0 | 6.5 | Good |
| | 5 | 60.5 | 82.4 | 6.5 | Good |
| | 6 | 58.0 | 78.5 | 8.5 | Bad, white turbidity, large one-sided wall thickness |

In Table 2, the time of passage is the time from release of a preform to start of orientation blow molding. The results obtained by molding a few samples in the range of more or less one second on the time of passage were shown in the molded state.

Embodiment 2

Molten resin of polypropylene was injected and filled into an injection mold to form a narrow-mouth preform 11 as shown in FIG. 1 similar to the case of Embodiment 1 by quick cooling.

Eight preforms having the same wall thickness were injection molded with changing cooling times, and the change by passage of time of the surface temperatures thereof at room temperature were measured.

The injection molding conditions are as follows:

| Weight of Material | 40 gr |
|---|---|
| Injection Temperature | 240° C. |
| Mold Temperature (cooling water) | 13° C. |
| Draft | 3.0° |
| Injection and Filling Time | 6.0 sec. |

Figure 7:
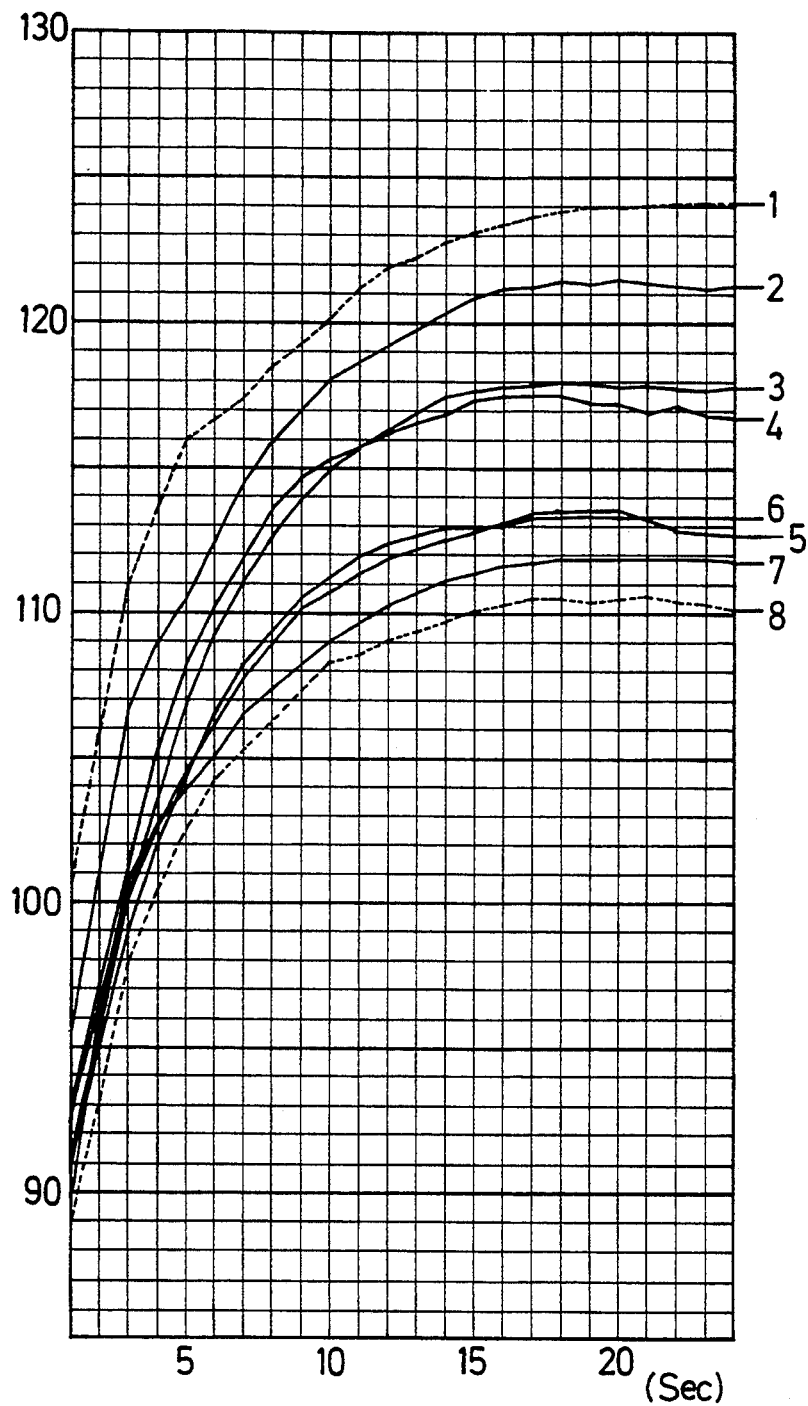
FIG. 7 is a graph showing a change of temperature with passage of time of the surface temperature of a high-temperature preform of Sample No. 4 obtained by injection molding polypropylene.

FIG. 7 shows the change by passage of time (average value) of the surface temperatures of the following samples at room temperature (22° C.), the main points of which are as given in Table 3 below.

TABLE 3

| Preform Wall Thickness (mm) | | Cooling Time (sec) | Preform Temperature (°C.) | | Peak Time (sec) |
|---|---|---|---|---|---|
| | | | 1 sec after release | Peak | |
| Sample No. 4 4.10 | 1 | 1.5 | 105.0 | 124.0 | 19 |
| | 2 | 2.0 | 95.5 | 121.4 | 18 |
| | 3 | 2.5 | 93.0 | 118.0 | 18 |
| | 4 | 3.0 | 92.5 | 117.6 | 16 |
| | 5 | 3.5 | 91.6 | 113.5 | 18 |
| | 6 | 4.5 | 91.0 | 113.3 | 17 |
| | 7 | 6.0 | 90.5 | 111.8 | 18 |
| | 8 | 5.5 | 89.0 | 110.5 | 17 |

Figure 6:
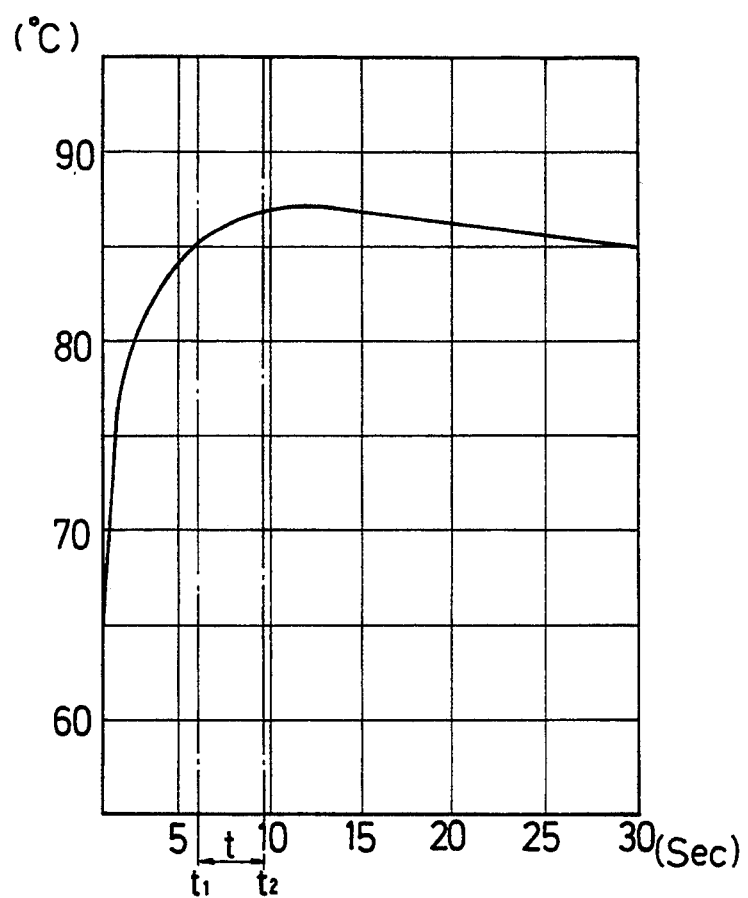
FIG. 6 is a graph showing a change of temperature with passage of time of the surface temperature when a preform made of polyethylene terephthalate is orientation blow molded.
Figure 8:
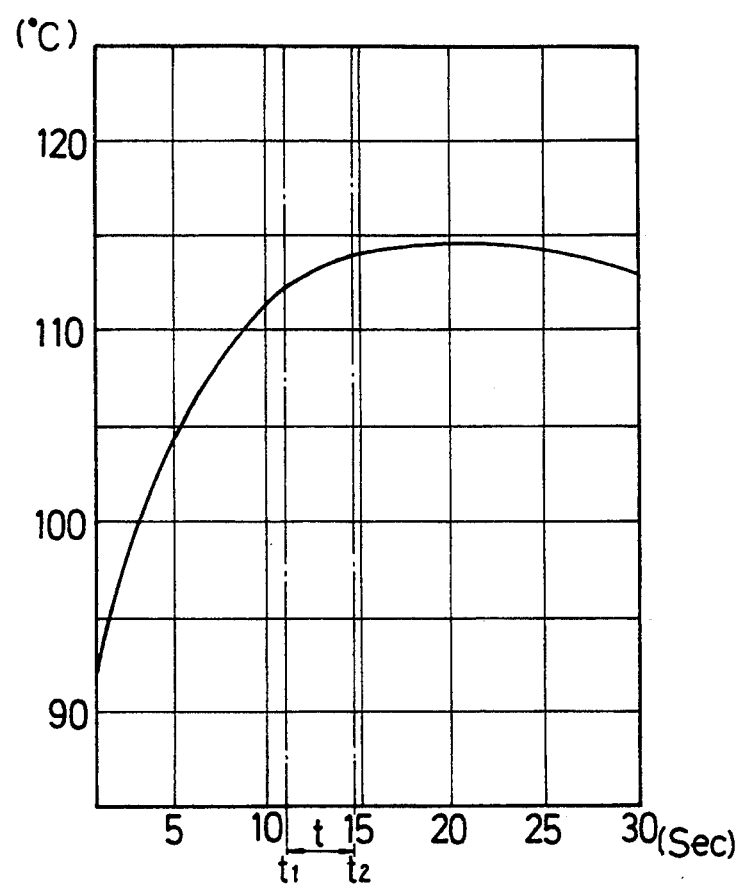
FIG. 8 is a graph showing a change of temperature with passage of time of the surface temperature when a preform made of polypropylene is orientation blow molded.

For the above-described Sample No. 4, orientation blow molding was carried out under blow air pressure of 12 kg/cm² within the time shown in FIG. 6 similar to the case of polyethylene terephthalate to form a bottle-like container 14 as indicated by the broken line in FIG. 1. It has been found that the best result was obtained when orientation blow molding was carried out within the time shown in FIG. 8, that is, within time t between the time $t_1$ before the surface temperature reaches the peak and time $t_2$ where the surface temperature seemed to have reached the peak.

However, in case of a preform whose surface temperature immediately after release is outside the range of 90° C. to 100° C. at a normal temperature or a preform whose surface temperature at the time of orientation blow molding is outside the temperature region of below 110° C. or above 1232 C., satisfactory results were not obtained as shown in Table 4 below.

TABLE 4

| Preform wall thickness (mm) | | Temperature 1 sec. after release | Temperature at orientation blow molding | Time of passage (sec.) | Molded state of molded articles. Wall thickness of body portion: 0.5 mm |
|---|---|---|---|---|---|
| Sample No. 4 4.10 | 1 | 105.0 | 123.5 | 15.5 | Bad, large one-sided wall thickness, burst |
| | 2 | 95.5 | 120.5 | 14.5 | Good |
| | 3 | 93.0 | 117.3 | 13.5 | Good |
| | 4 | 92.5 | 116.8 | 12.5 | Good |
| | 5 | 91.6 | 112.5 | 14.0 | Good |
| | 6 | 91.0 | 113.0 | 14.0 | Good |

TABLE 4-continued

| Preform wall thickness (mm) | Temperature 1 sec. after release | Temperature at orientation blow molding | Time of passage (sec.) | Molded state of molded articles. Wall thickness of body portion: 0.5 mm |
| --- | --- | --- | --- | --- |
| 7 | 90.5 | 111.3 | 14.0 | Good |
| 8 | 89.0 | 110.0 | 15.0 | Bad, large one-sided wall thickness, burst |

It is apparent from FIGS. 3 to 5 showing the change of temperature with passage of time that in injection molding the preform 11, there is an allowable range of cooling time. It is also apparent that when the allowable times are compared between those different in wall thickness, there is cooling time adapted to each other.

FIG. 9 is a graph which selects two cooling times adapted to each other with respect to Sample Nos. 1 and 2 from Table 1 to depict the change of temperature with passage of time of the surface temperatures in that case. A temperature difference $\Delta t$ at the allowable time of orientation blow molding of a thick wall thickness portion D1 and a thin wall thickness portion D2 was 2.5° C. to 3.0° C.

Orientation blow molding was carried out for a narrow-mouth container formed from a preform with distribution of wall thickness intentionally changed.

Embodiment 3

A preform 11 shown in FIG. 1 whose wall thickness is made thin from an upper portion toward a bottom thereof so as to have a difference in wall thickness distribution of the entire body was injection molded from polyethylene terephthalate, and a one-liter container 14 was orientation blow molded from the preform.

In injection molding, intentionally, the wall thickness, 3.05 mm, of the D1 portion of the preform 11 is differentiated from the wall thickness, 2.80 mm, of the D2 portion. Furthermore, cooling time adapted to the wall thicknesses for both was selected from Sample Nos. 1 and 2 in Table 1 so that the surface temperature of the preform immediately after release is in the range of 60° C. to 70° C.

| Injection molding conditions: | |
| --- | --- |
| Weight of Material | 33 gr |
| Injection Temperature | 275° C. |
| Mold Temperature (cooling water) | 13° C. |
| Draft | 1.5° |
| Injection and Filling Time | 5.3 sec. |
| Example 1: | |
| Cooling Time (1) | 4.1 sec. |
| Surface Temperature (D1) | |
| Immediately After Release | 63.8° C. |
| At Blow Molding | 85.7° C. |
| Surface Temperature (D2) | |
| Immediately After Release | 68.0° C. |
| At Blow Molding | 86.0° C. |
| Example 2: | |
| Cooling Time (2) | 4.5 sec. |
| Surface Temperature (D1) | |
| Immediately After Release | 62.4° C. |
| At Blow Molding | 82.5° C. |
| Surface Temperature (D2) | |
| Immediately After Release | 67.0° C. |
| At Blow Molding | 82.6° C. |
| Time of Passage (After Release) | 7.5 sec. |
| Blow Air Pressure | 14 kg/cm$^2$ |

In the Examples 1 and 2, the molded state of the orientation blow molded container 14 was good. The transparency of the container is excellent, one-sided wall thickness thereof was hardly recognized, and the wall thickness (0.3 mm) of the body portion was uniform.

It is understood from the foregoing that the most preferable molding method for the three-station system is to adjust wall thicknesses of various portions of oriented portions of a preform according to an orienting state and control an orienting state of an oriented portion from a difference of heat amount which differs according to wall thickness, in other words, to carry out orientation blow molding in the state where the temperature of the preform is uneven as a whole. Adjustment of a wall thickness can be easily made by grinding a core mold or applying a padding through plating or the like, and a delicate difference of wall thickness can be also provided.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. An injection orientation blow molding method comprising the steps of:
    injecting and filling molten resin into an injection mold to form a preform;
    holding a mouth portion of said preform by a lip mold cooperating with said injection mold for forming said mouth portion;
    transferring a preform by said lip mold from the injection mold to a blow mold; and
    orientation blow molding the preform into a thin-wall hollow molded article, the method being characterized by further comprising:
    quick cooling the preform in said injection mold by an amount sufficient to form a skin layer on a surface of the preform which enables the preform to maintain its shape;
    removing the preform from the injection mold when an internal portion of the preform lying inward from the skin layer is at a higher temperature than the skin layer; and
    orientation blow molding the preform within a given time interval which terminates before a surface temperature of the preform, which rises due to the elevated internal temperature, reaches a predetermined peak temperature.

2. An injection orientation blow molding method according to claim 1 further comprising the step of controlling the internal heat of various portions of the preform by providing said injection mold with a cavity for receiving the molten resin having a varying wall thickness to control the thickness of the preform to obtain a desired heat quantity, which heat quantity differs with wall thickness.

3. An injection orientation blow molding method according to claim 1 further comprising the step of cooling the preform by removing the preform from the injection mold and maintaining the preform in the released condition for a predetermined time interval prior to initiation of the orientation blow molding step wherein the time interval in which the preform is so maintained to make orientation blow molding possible at any wall thickness of the preform.

4. An injection orientation blow molding method according to claim 1 wherein the step of injecting and filling to form a preform further comprises the step of providing the injection mold with a cavity which controls the wall thickness of the preform wherein the thickness of the preform is selected according to the degree of orientation various portions of the preform are to undergo during orientation blow molding.

5. The method of claim 1 wherein the preform is formed from polyethylene terephthalate and the step of removing the preform further includes removing the preform from the injection mold when the surface temperature of the preform is in the range of 60° C. to 70° C.

6. An injection orientation blow molding method comprising the steps of:
quick cooling a preform made of a polyethylene terephthalate in an injection mold by an amount sufficient to form a skin layer on the surface of the preform engaging the injection mold, said skin layer enabling the preform to maintain its shape upon release of the preform from the mold;
releasing the preform from the injection mold at a time such that, immediately after release from the injection mold, the temperature of the skin layer is above 60° C. and below 70° C. and an internal portion of the preform lying inward from the skin layer is at a higher temperature than the skin layer; and
orientation blow molding the preform during a given time interval which terminates before the surface temperature of the preform reaches a peak temperature, and wherein said time interval starts when the surface temperature is above 80° C. and terminates when the surface temperature is below 95° C.

7. An injection orientation blow molding method according to claim 6 wherein the step of quick cooling the preform further comprises controlling the time when the preform is cooled to occur within a specific time interval to render orientation blow molding after release possible regardless of the wall thickness of the preform.

8. An injection orientation blow molding method according to claim 6 wherein the heat of the internal portion of the preform is controlled by maintaining the injection mold at a predetermined cooling temperature and by providing the mold with a cavity receiving molten resin having a varying wall thickness to control the wall thickness of the preform such that the degree of orientation of the preform during orientation blow molding is controlled by a temperature different at the desired portions of the preform, the temperature at each portion of the preform being a function of wall thickness.

9. An injection orientation blow molding method according to claim 6 further comprising a step of injection molding the preform in said injection mold wherein the injection mold has a cavity for receiving the molten resins, said molten resin being injection molded in the cavity and wherein the dimensions of the cavity control the thickness of the injection molded preform and wherein the thickness is controlled according to the desired degree of orientation various portions of the preform undergo during orientation blow molding.

10. An injection orientation blow molding method comprising the steps of:
making a preform of polypropylene in an injection mold;
quick cooling the preform by an amount sufficient to form a skin layer on the surface of the preform engaging the injection mold, said skin layer enabling the preform to maintain its shape upon release of the preform from the mold;
releasing the preform from said injection mold such that, immediately after release from the mold, the temperature of the skin layer is above 90° C. and below 100° C. and an internal portion of the preform lying inward from the skin layer is at a higher temperature than the skin layer; and
orientation blow molding the preform during a time interval which begins when the surface temperature of the preform is above 100° C. and which terminates when the surface temperature of the preform is below a peak temperature and is below 122° C.

11. An injection orientation blow molding method according to claim 10 wherein the step of quick cooling the preform further comprises controlling the time when the preform is cooled to occur within a specific time interval to render orientation blow molding after release possible regardless of the wall thickness of the preform.

12. An injection orientation blow molding method according to claim 10 wherein the temperature of the internal portion of the preform is controlled by maintaining the injection mold at a predetermined cooling temperature and by providing the injection mold with a cavity receiving molten resin having a varying wall thickness to control the wall thickness of the preform such that the degree of orientation of the preform during orientation blow molding is controlled by temperature at each portion of the preform, the temperature being a function of wall thickness.

13. An injection orientation blow molding method according to claim 10 further comprising a step of injection molding the preform in said injection mold wherein the injection mold has a cavity for receiving the molten resin, said molten resin being injection molded in the cavity and wherein the dimensions of the cavity control the thickness of the injection molded preform and wherein the thickness is controlled according to the desired degree of orientation various portions of the preform undergo during orientation blow molding.

14. A method for injection orientation blow molding a thin walled hollow molded article comprising the steps of:
(a) providing an injection mold for molding a preform and including a lip mold for forming a mouth portion and a body mold for forming the main body portion, said injection mold having cavity means designed to provide a preform of a predetermined configuration;
(b) injecting molten resin into the injection mold cavity means;
(c) holding the mouth portion of said preform by said lip mold which cooperates with the body mold to initially form the preform;
(d) releasing the preform from the body mold;
(e) transferring the preform from the injection mold towards a blow mold by means of said lip mold;

(f) orientation blow molding the preform into a thin wall hollow molded article in said blow mold;

said method being characterized by the step of quick cooling the preform after completing step (c) and before performing step (d) to control the temperature of said injection mold to form a skin layer to maintain the shape of the preform engaging said injection mold;

step (d) further comprising releasing the preform therefrom during an interval which begins when an internal temperature of the preform is higher than the temperature of the skin layer and which ends before the temperature of the preform skin layer has reached a peak value; and blow molding the preform prior to the time that the temperature of the skin layer reaches said predetermined peak value.

15. The method of claim 14 wherein the step of quick cooling the preform further includes the step of lowering the temperature of the skin layer of the preform to a value which is less than a temperature value which is acceptable for orientation blow molding.

16. The method of claim 14 wherein the step of orientation blow molding the preform prior to the time that the temperature of the skin layer reaches said predetermined peak value further comprises initiating the orientation blow molding at least one-half second before the skin layer of the preform reaches said predetermined peak value.

* * * * *

REEXAMINATION CERTIFICATE (4124th)

United States Patent [19]
Takeuchi

[11] B1 5,364,585
[45] Certificate Issued: Jul. 25, 2000

[54] INJECTION ORIENTATION BLOW MOLDING METHOD

[75] Inventor: Setsuyuki Takeuchi, Toguramachi, Japan

[73] Assignee: A. K. Technical Laboratory, Inc., Nagano-Ken, Japan

Reexamination Request:
No. 90/005,549, Nov. 5, 1999

Reexamination Certificate for:
Patent No.: 5,364,585
Issued: Nov. 15, 1994
Appl. No.: 07/967,529
Filed: Oct. 27, 1992

Related U.S. Application Data

[63] Continuation of application No. 07/676,849, Mar. 28, 1991, abandoned.

[30] Foreign Application Priority Data

| Mar. 30, 1990 | [JP] | Japan | 2-85594 |
| May 22, 1990 | [JP] | Japan | 2-132325 |
| Mar. 7, 1991 | [JP] | Japan | 3-068036 |

[51] Int. Cl.[7] ............... B29C 49/06; B29C 49/64
[52] U.S. Cl. ............... 264/520; 264/532; 264/537
[58] Field of Search ............... 264/520, 521, 264/523, 537, 538; 425/526, 529

[56] References Cited

U.S. PATENT DOCUMENTS

| Re. 29,696 | 7/1978 | Chin et al. . |
| 3,170,971 | 2/1965 | Ninneman et al. . |
| 3,244,778 | 4/1966 | Ninneman et al. . |
| 3,337,667 | 8/1967 | Ninneman et al. . |
| 3,492,387 | 1/1970 | Larson . |
| 3,505,440 | 4/1970 | Mason . |
| 3,797,983 | 3/1974 | Merz . |
| 3,842,149 | 10/1974 | Vollers . |
| 3,873,660 | 3/1975 | Reilly . |
| 3,966,378 | 6/1976 | Valyi . |
| 4,036,927 | 7/1977 | Stolki . |
| 4,044,086 | 8/1977 | McChesney . |
| 4,054,629 | 10/1977 | Wang et al. . |
| 4,151,248 | 4/1979 | Valyi . |
| 4,356,142 | 10/1982 | Germanio . |
| 4,385,089 | 5/1983 | Bonnebat et al. . |
| 4,588,620 | 5/1986 | Marcinek . |
| 4,615,667 | 10/1986 | Roy . |
| 5,011,648 | 4/1991 | Garver et al. . |

FOREIGN PATENT DOCUMENTS 2 010 734  7/1979  United Kingdom .

OTHER PUBLICATIONS tpT–TPG–79–2 Delia Associates tpT Injection Stretch Blow Molding System 1979.

New tpT Laboratory and Training Injection Stretch Blow Molding Machine 1979.

Emery I. Valyi Fundamentals of Producing Bi–Axially Oriented Rigid Containers Mar. 1980.

Emery I. Valyi Das tpT–Spritz–und Streckblasverfahren 1976.

(List continued on next page.)

Primary Examiner—Jan H. Silbaugh

[57] ABSTRACT

A molding method for continuously carrying out the steps from injection molding of a synthetic resin preform to orientation blow molding thereof into a thin-wall-hollow molded article, characterized in that releasing of the preform from the injection mold is carried out during the state where the shape thereof can be maintained by a skin layer produced at the surface by quick cooling and the state where internal cooling is not yet finished and the temperature is high, and orientation blow molding of the preform is carried out within a time till a surface temperature of the preform which rises by it own internal temperature reaches a peak temperature.

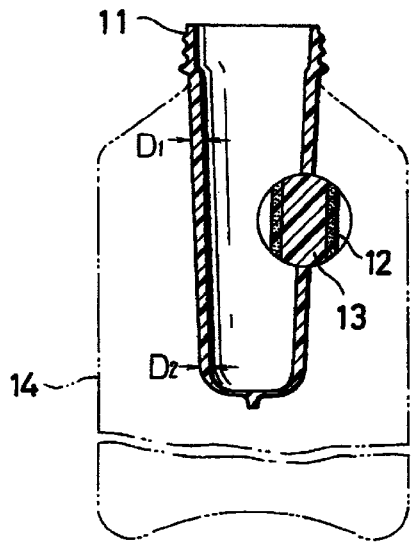

OTHER PUBLICATIONS

Edward E. Denison A Layman's Guide to PET Chemistry and Processing Mar. 1980.
Aoki Corporation Injection Orientation Blow Molder 1988.
Larry Beres AOKI Stretch–Blow Molding Machines: The Machine You've Been Expecting 1990.
Rosato, "Plastics Processing Data Handbook," p. 197.
Raff, "High Polymers vol. XI: Polyethylene."
John Granata Stretch Blow Molding Process of PET on Injection Blow Molding Equipment Oct. 1987.
K. Lonsdale Polyester Polymers in Packaging, Sep. 1976.
Setsuyuki Takeuchi Development of Injection Stretch Blow Molding Technology for Polypropylene Bottles 1986.
Setsuyuki Takeuchi Development of the III–Station System 1990.
Eastman Chemical Co., Blow molding Bottles from EAST-PAK PET Polyester Dec. 1994.
Blow Molding Handbook by Rosato 1989, pp. 545 to 548.
Setsuyuki Takeuchi Stretch–Blow Molding Machine for PET–Its Performance and Productivity Apr.–May 1977 pp. 15 to 20.
Takeuchi, Stretch–Blow Molding Machine for PET: Its Performance and Productivity.
Beres, "Three Station Stretch–Blow Molding".
Takeuchi & Iriko, "Parison Pre–stretch Injection Blow Molding," pp. 554–556.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–16 is confirmed.

* * * * *